United States Patent [19]
Naclerio

[11] Patent Number: 5,687,237
[45] Date of Patent: Nov. 11, 1997

[54] ENCRYPTION KEY MANAGEMENT SYSTEM FOR AN INTEGRATED CIRCUIT

[75] Inventor: Edward J. Naclerio, Madison, Conn.

[73] Assignee: Pitney Bowes Inc., Stamford, Conn.

[21] Appl. No.: 556,685

[22] Filed: Nov. 13, 1995

[51] Int. Cl.$^6$ .................................................. H04K 1/00
[52] U.S. Cl. ........................... 380/29; 380/49; 380/21; 380/25; 380/45
[58] Field of Search .................... 380/21, 23, 25, 380/49, 29, 45

[56] References Cited

U.S. PATENT DOCUMENTS

| | | | |
|---|---|---|---|
| 4,747,532 | 5/1988 | Gilham | 380/23 |
| 4,907,271 | 3/1990 | Gilham | 380/25 |
| 5,121,432 | 6/1992 | Gilham et al. | 380/51 |
| 5,379,344 | 1/1995 | Larsson et al. | 380/23 |

*Primary Examiner*—David C. Cain
*Attorney, Agent, or Firm*—Angelo N. Chaclas; Charles G. Parks, Jr.; Melvin J. Scolnick

[57] ABSTRACT

A microcontroller is in bus communication with an improved integrated circuit for providing data to the integrated circuit and reading data from the integrated circuit. The integrated circuit selectively processes data by encrypting or decrypting the data. The integrated circuit includes a data register for receiving data from the microcontroller via the data bus and storing the data. A DES key register is also provided for receiving and storing a key (Ks) from the controller via the data bus and a DES control register is provided for receiving and storing control signal from the controller via the data bus. The integrated circuit has a digital encryption engine module for reading the data from the data register and the DES key register in response to specific control signal stored in as DES control register and for processing the data utilizing the key (Ks) and outputting the encrypted data. A second DES key register (Kv) isolated from the data bus stores second key(Kv). A multiplexer is used for selectively enabling the first DES key (Ks) from the DES Key register or the second DES key (Kv) from the second DES Key register in response to the data in the DES control register. In addition, a internal key register stories an internal key (Ki) and a results register is provided for storing the processed data and directing the processed data to the data bus. A demultiplexer is for receiving the processed data from the DES engine and directing the processed data to the internal key register or the results register allow as a further alternative use of the internal key to encrypt or decrypt data.

5 Claims, 2 Drawing Sheets

ENCRYPTION KEY MANAGEMENT SYSTEM FOR AN INTEGRATED CIRCUIT

BACKGROUND OF THE INVENTION

The present invention relates to a method and apparatus for encrypting and decrypting electronic data messages and, more particularly, a method and apparatus for encrypting and decrypting electronic data messages most suitable for application in mail processing systems.

Conventionally, encryption and decryption system are used to secure electronic data for transmission from one point to another point over an unsecured communication channel. A known system is composed of a microcontroller in electronic bus communication with an integrated circuit. The integrated circuit will include what is commonly referred to as a digital encryption engine (DES) and a number of registers, one of such registers being a key register. Generally, the microcontroller is programmed to retrieve the DES key data from a non-volatile memory unit and write that DES key data in the key register of the integrated circuit. Next, encrypted or clear data is placed on the data bus and directed to the DES engine. The DES engine then decrypts the data provided or encrypts the provided data depending on control signals from the microcontroller. It is noted that the conventional system exposes the stored encryption key to an unsecured environment when the encryption key is placed on the data bus. It is also possible to gain unauthorized access to the encryption key by dumping the systems non-volatile memory. Having obtained access to the encryption key, a system intruder can fraudulently alter the data as so desired.

SUMMARY OF THE INVENTION

It is an object of the present invention to present a system wherein should an intruder gain access to the encryption key, the intruder would still be unable to properly decrypt or encrypt system data.

It is a further objective of the present invention to present an encryption/decryption system wherein the option is provided to utilize one of three DES keys provided for use by the DES engine wherein at least one of the DES key are maintained internal to the IC chip.

A typical system includes a digital encryption engine is presented to the system in form of an integrated circuit (IC)chip. An encryption (or decryption) key is loaded into the DES Key Register which form part of the IC chip. The IC chip also has a DES Data Register that is loaded with the data to for encrypting or decrypting by the DES engine. The encryption or decryption process is selected by a microcontroller that presents to the IC chip the appropriate control signals.

In the improved system the DES Key can be input to the DES Engine Key Register as is conventional, but also a fixed DES key internal to the IC chip can be used. As a further alternative a derived third DES key set in a feedback path from the output from the DES Engine is available. A multiplexer is used to select which of the three DES keys available will be used to encrypt or decrypt data for the DES engine.

During the manufacturing process, a first DES key (Kv) is caused to be stored a non-volatile Kv register of IC chip. A second DES Key (Ke) is stored in the system non-volatile memory unit in encrypted form. In operation, the encrypted encryption key (Ke) is loaded into a DES Key register and data is loaded into the DES Data Register of the IC chip under the control of the system microcontroller. The Kv Register is selected to drive the DES Key input to the DES Engine. The decryption process is then selected. The resulting decrypted DES key (Ki) will be directed to the internal key register. The output of the internal key register being directed back to the input of the DES engine. The value in the internal key register can now be used to for further operations with the DES Engine.

Note that neither the value in the Kv register nor the value in the internal key register is available to the data bus. These values are held internal to the IC and can not be recovered except by destroying the IC devices.

Selection of the Kv Register as the source for the DES Key input will automatically force the DES Output to the Internal Key Register. This prevents an attacker from using the IC repetitively to ascertain the value of Kv.

DETAILED DESCRIPTION OF THE DRAWINGS

Figure 1:
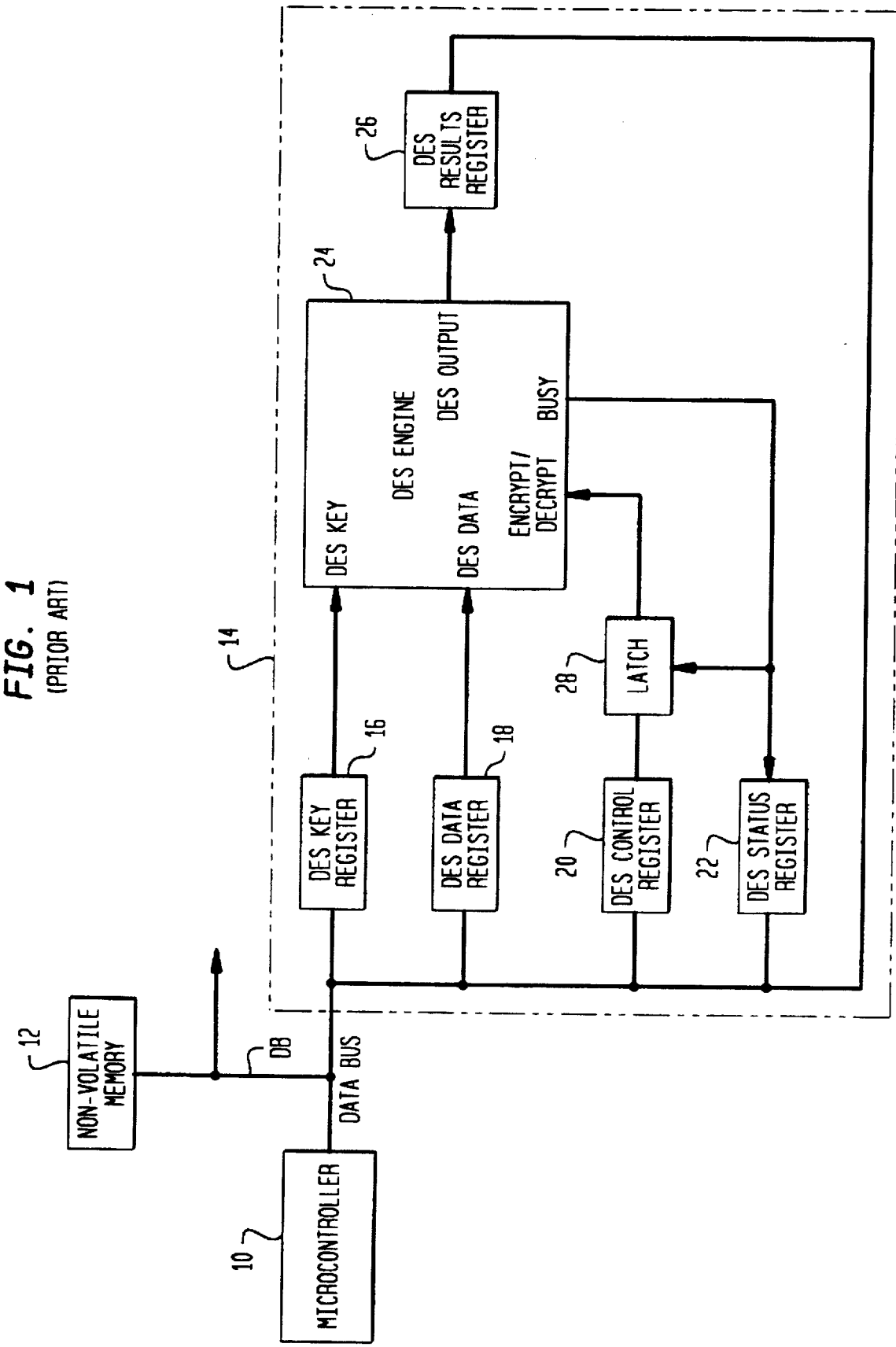
FIG. 1 is a schematic of a prior art microcontroller system including an encryption/decryption IC chip.

Referring to FIG. 1, a prior art system is composed of a programmable microcontroller 10 in bus (DB) communication with a non-volatile memory 12 and an encryption/decryption IC 14. The IC 14 includes a number of registers 16, 18, 20 and 22, a latch 28, DES engine 24 and results register 26. An encryption (:or decryption) key is loaded into the DES Key Register 16. The DES Data Register 18 is then loaded with the data to process. The encryption or decryption process is selected when the microcontroller loads the appropriate value in the DES Control Register 20.

Once an encryption or decryption process begins, the value in the control register 20 is latched on the select encryption/decryption control input of the DES engine 24 by the latch 28. The status output of the DES engine 24 then goes active to hold the latch 18. Consequently, the encryption/decryption control input of the DES engine 24 cannot be changed until after the encryption or decryption process is complete. The progress of the process can be monitored by the microcontroller 10 by reading the output of the DES Status Register 20. Once complete, the result of the process is directed to the DES results register 26 and can be read by the microcontroller 10.

It should be appreciated that in some system several encryption keys are needed, each key being stored in the non-volatile memory 12. Depending on the type of data that is to be encrypted or decrypted, the microcontroller 10 may be programmed to select the appropriate key from the non-volatile memory 12 and place that key in the DES key register 16 for use by the IC 14. It should be further noted that with the known system described that if an attacker monitored the data bus for accesses to the DES Key Register, he would be able to ascertain the encryption key and thereby jeopardize system security.

The foregoing is a description of a known and conventional system and method for encrypting and decrypting data. For the purpose of brevity, conventional system procedures well known in the art have not been particularly described. But it should be appreciated that any suitable method may be used for such convention operations as addressing the registers and such other conventional practices.

Figure 2:
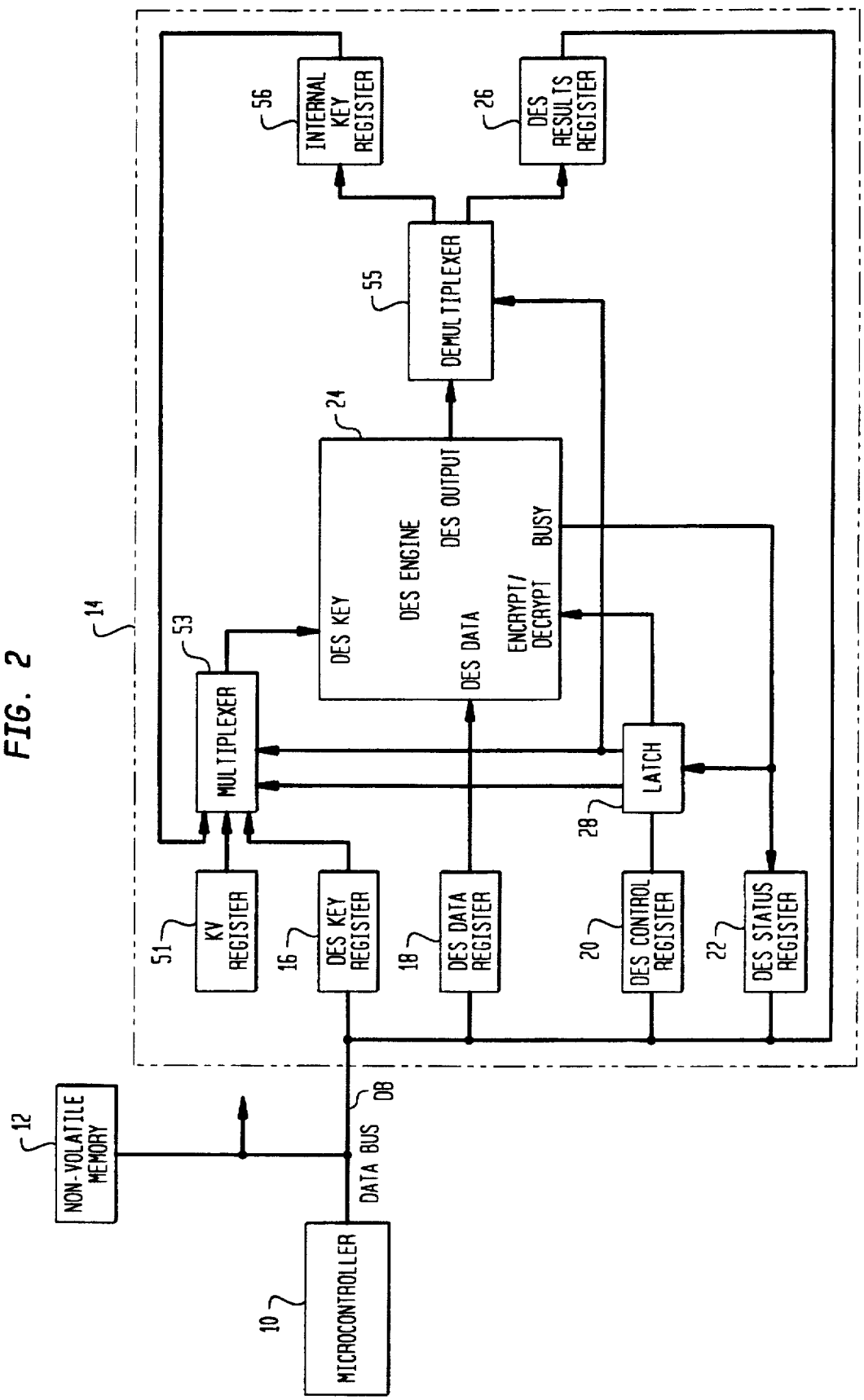
FIG. 2 is a schematic of a microcontroller system having an improved encryption/decryption IC chip in accordance with the present invention.

Referring to FIG. 2, an improvement to the afore described system includes adding a second DES key register (Kv) 51 isolated from the data bus, a multiplexer 53, a demultiplexer 55 and an internal key register 56 to the IC 14. The output from the DES key register 16, the DES key register 51 and the internal key register is directed to the input of the multiplexer 53. As a result, the DES Key input to the DES engine 24 can selectively be the output from the DES key register 16 as before, a fixed key (Kv) internally loaded into the DES key register 51 or a key back from the output from the DES Engine 24 stored in the internal key register 56 in a manner which is described subsequently. The multiplexer 53 is used to select the source of the key based upon the output from the DES control register 20 that is directed through the latch 28 to the control inputs of the multiplexer 53. The output from the DES Engine 24 can be directed to either the internal key register 56 for feedback to the multiplexer 53 and, thereafter, into the DES Engine 24 or the DES Result Register, as in the previous diagram.

During the manufacturing process, an encryption key Ks is encrypted and stored in the nonvolatile memory 12. Also a clear encryption Key Kv is stored in non-volatile register 51 of the IC chip 14. In operation, the encrypted encryption key Ks is loaded into the DES Data Register 18 by the microcontroller 10. The Kv Register is selected by the multiplexer 53 in responses to the output from the DES control register 20 to drive the DES Key input to the DES Engine 24. The decryption process of the DES engine 24 is then selected as a result of the output of the DES control register 20. The resulting output from the DES engine 24 is directed to the demultiplexer 55, which as a result of the applied control signals from the DES control register 20 through the latch 28, directs the output from the DES engine 24 to the Internal Key Register 56. The data now in the Internal Key Register 56 can thereafter be used for further operations with the DES Engine.

It is here noted that neither the data in the Kv Register 51 nor the data in the Internal Key Register 56 are available to the Data Bus. This data is held internal to the IC chip 14 and can not be recovered except by destroying the IC chip 14. Additional security can be obtained by partitioning the Kv register such that the Kv data is physically scattered throughout the IC chip 14 using any suitable method or otherwise hidden within the IC chip 14 utilizing any of a number of suitable methods to make its discovery extremely difficult.

In the preferred embodiment, selection of the Kv Register 51 by the DES control register as the source for the DES Key input from the multiplexer 53 will automatically force the DES engine 24 output to be directed to the Internal Key Register 56 by the demultiplexer 55. This prevents an attacker from using the IC chip 14 repetitively to ascertain the Kv data by correlating input data to output data of the DES engine 24. Also, the input and output selection signals of the DES control register 20 are latched along with the signal that specifies the encryption or decryption process once the DES Engine is enabled. This prevents an attacker from changing the destination of the result once encryption or decryption is invoked.

Though a multiplexer 53 is shown in FIG. 2, the resultant circuit could be realized with tri-state output controls on each of the registers 16, 18, and 56 for driving the DES Key input to the DES Engine 24. The demultiplexer 55 on the output from the DES Engine 24 can be realized differently by driving the input to both registers 26 and 56, however, only the appropriate destination register would receive the clock signal to store the result using conventional selection means.

What is claimed is:

1. An improved integrated circuit for selectively processing data by encrypting or decrypting said data having:

a data bus, a controller in bus communication with said integrated circuit via said data bus for providing data to said integrated circuit and reading data from said integrated circuit, a data register for receiving data from said controller via said data bus and storing said data, a DES key register for receiving and storing first key data (Ks) from said controller via said data bus, a DES control register for receiving and storing control signal from said controller via said data bus, an encryption engine module for reading said data from said data register and said DES key register in response to a specific control signal stored in as DES control register and for processing said data utilizing said first key data (Ks) and outputting said processed data, wherein the improvement comprises:

said integrated circuit further having, a second DES key register (Kv) isolated from said data bus and having stored therein a second key data (Kv), first selection means for selecting a selected key data from said first key data (Ks) in said DES Key register or said second key data (Kv) in said second DES Key register in response to said data in said DES control register and directing said selected key data to said encryption engine module.

2. An improved integrated circuit as claimed in claim 1 wherein said encryption engine module includes means for selectively processing said data by encrypting said data or decrypting said data in response to said control signal stored in said DES control register.

3. An improved integrated circuit as claimed in claim 2 further comprising:

a internal key register for storing an internal key (Ki) data a results register for storing said processed data and directing said processed data to said data bus, second selection means for receiving said processed data from said encryption engine module and directing said processed data to said internal key register or said results register.

4. An improved integrated circuit as claimed in claim 3 wherein said first selection means further comprises means from receiving said internal key (Ki) data stored in said internal key register and selectively directing said internal key (Ki) to said encryption engine module in response to said control signals in said DES control register.

5. An improved integrated circuit as claimed in claim 4 further comprising means for causing said second selection means to direct said output of said DES engine to said internal key register when said first selection means selects said second key data (Kv) in response to said control signals.

* * * * *